United States Patent

Meya

Patent Number: 6,073,752
Date of Patent: Jun. 13, 2000

[54] SCRAPER CHAIN BELT FOR SCRAPER CHAIN CONVEYORS

[75] Inventor: Hans Meya, Werne, Germany

[73] Assignee: DBT Deutsche Bergbau-Technik GmbH, Germany

[21] Appl. No.: 08/990,904

[22] Filed: Dec. 15, 1997

[30] Foreign Application Priority Data

Jan. 17, 1997 [DE] Germany .............................. 197 01 580
Jan. 19, 1997 [DE] Germany .............................. 197 26 028

[51] Int. Cl.[7] .................................................. B65G 19/24
[52] U.S. Cl. ............................................. 198/731; 198/732
[58] Field of Search ..................................... 198/731, 733

[56] References Cited

U.S. PATENT DOCUMENTS

| | | | |
|---|---|---|---|
| 1,020,863 | 3/1912 | Weichseldorfer | 198/731 |
| 3,986,602 | 10/1976 | Dretzke | 198/731 |
| 4,113,084 | 9/1978 | Temme | 198/731 |
| 4,312,443 | 1/1982 | Niemoller et al. | 198/733 X |
| 4,867,300 | 9/1989 | Braun et al. | 198/731 |

FOREIGN PATENT DOCUMENTS

| | | |
|---|---|---|
| 1 949 166 | 11/1966 | Germany . |
| 19 37 608 | 4/1971 | Germany . |
| 21 06 967 | 8/1972 | Germany . |
| 22 47 300 | 3/1974 | Germany . |
| 81 34 429 | 4/1982 | Germany . |
| 32 19 178 | 11/1983 | Germany . |
| 32 34 137 | 3/1984 | Germany . |
| 32 35 474 | 3/1984 | Germany . |
| 36 15 734 | 11/1987 | Germany . |

*Primary Examiner*—Christopher P. Ellis
*Assistant Examiner*—Gene O. Crawford
*Attorney, Agent, or Firm*—Vickers, Daniels & Young

[57] ABSTRACT

The scraper chain belt according to the invention is preferably intended for scraper chain conveyors of long conveying lengths and correspondingly high drive outputs, and consists of vertical and horizontal chain links (1, 2) which are suspended articulated within one another, wherein the vertical chain links (1) advantageously have a surrounding out-of-round cross-section which is provided with a flat (6) on its external contour, whilst the horizontal chain links (2), which serve for the scraper connection, are formed in the manner of webbed chain links having a central web (12) which passes transversely through their internal opening. The scraper connection is preferably effected with the aid of studs (19) which are fixedly disposed on the scrapers (13) and which point towards the scraper base, and which pass through the insertion openings (20) in the central webs (12) of the horizontal chain links (2), wherein the scraper connection can be secured with the aid of locking elements.

19 Claims, 8 Drawing Sheets

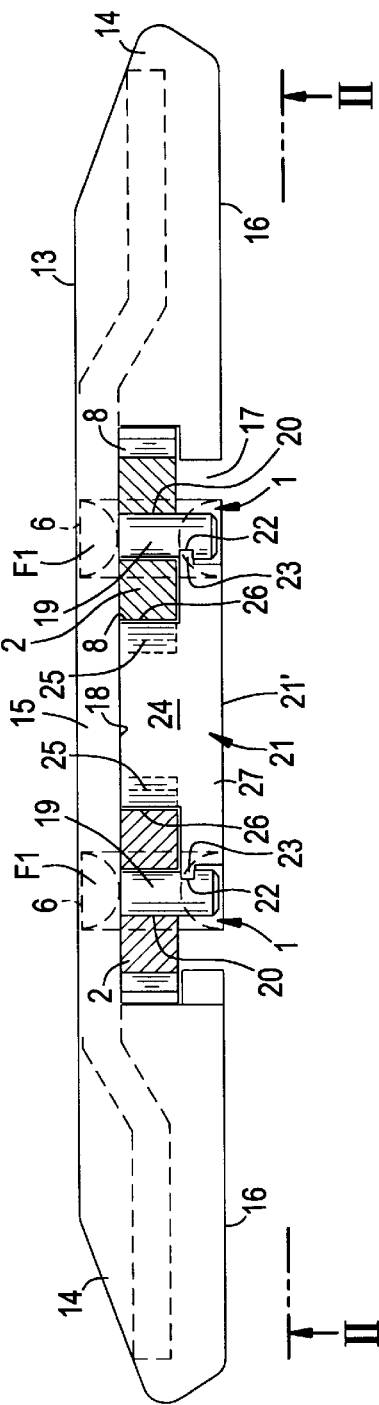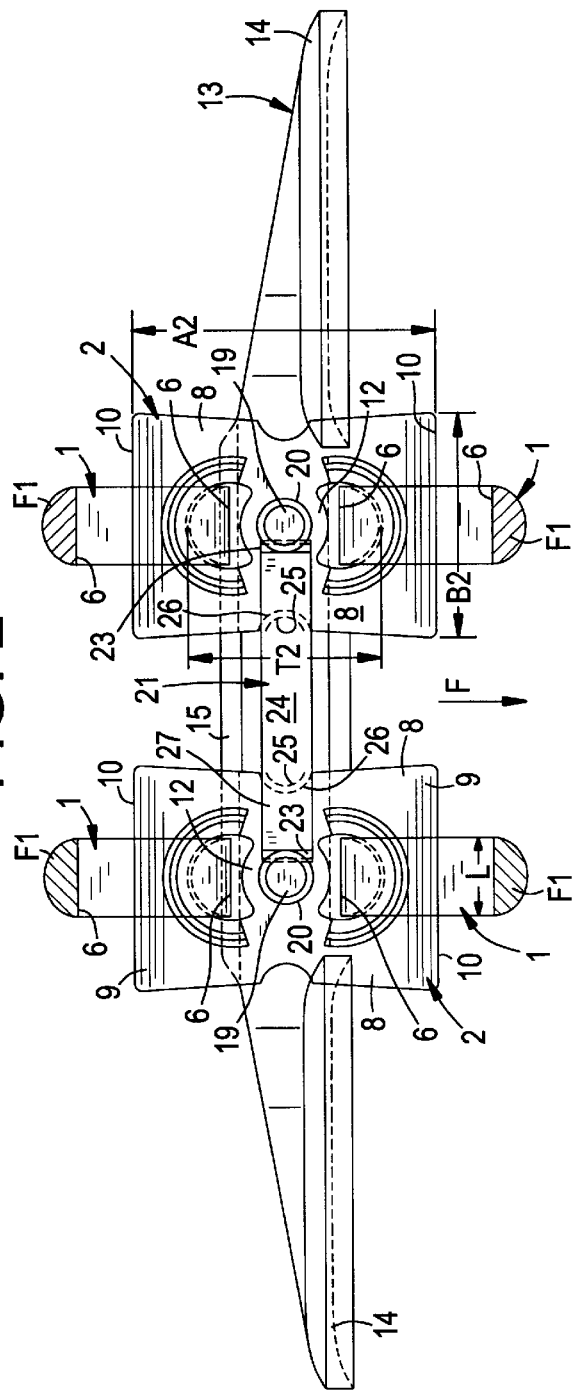

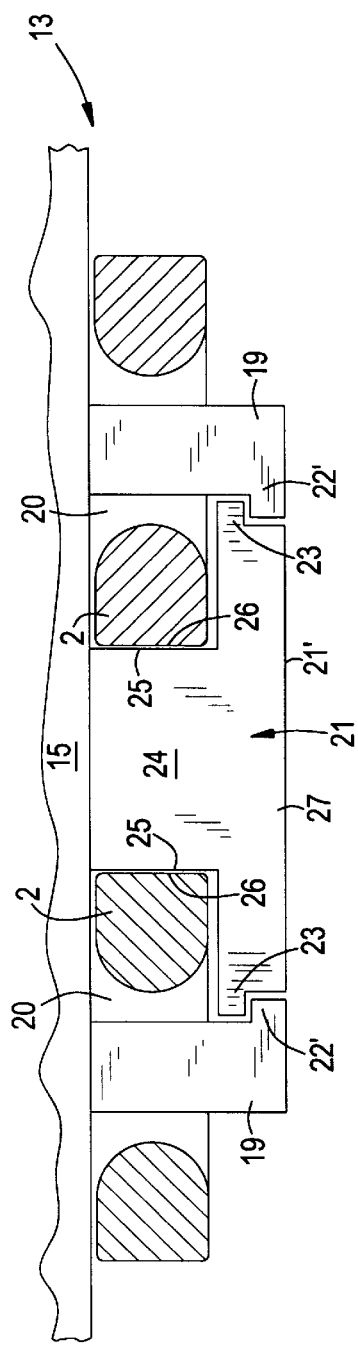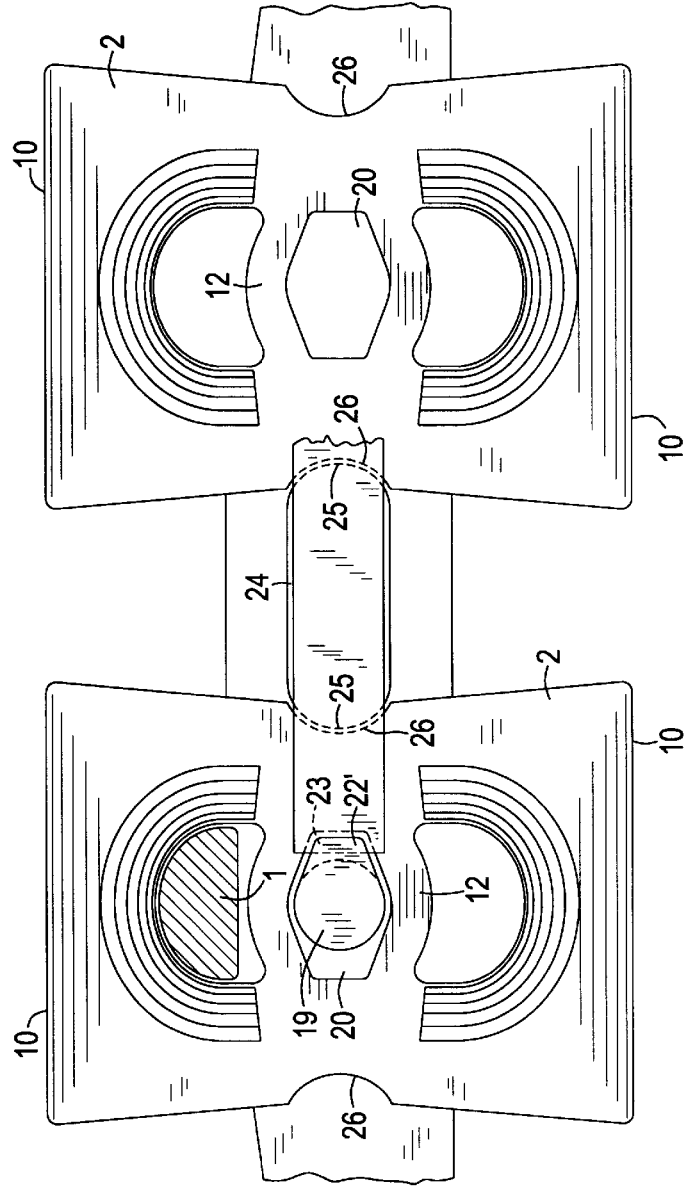

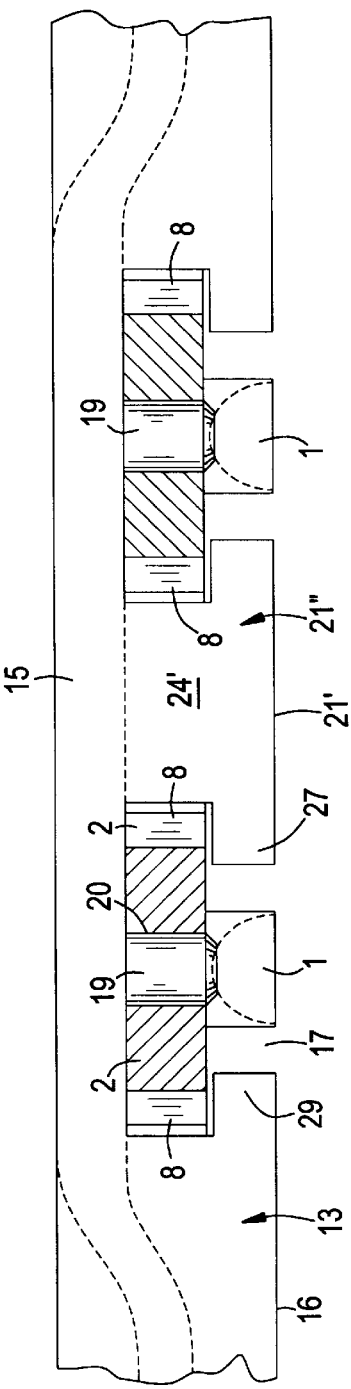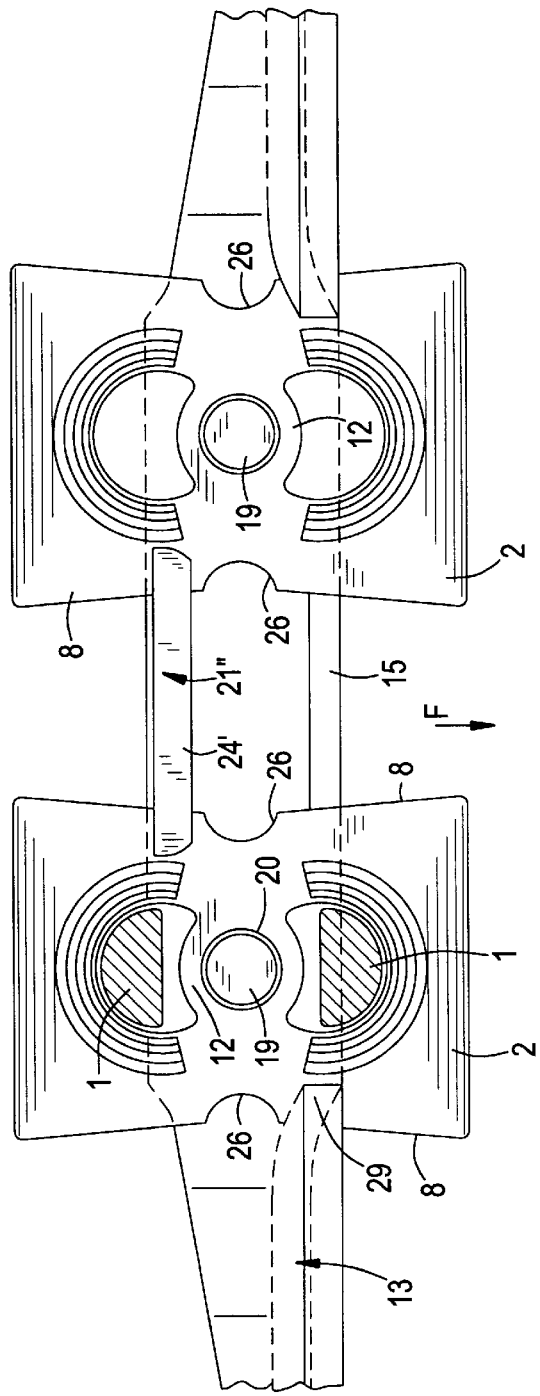

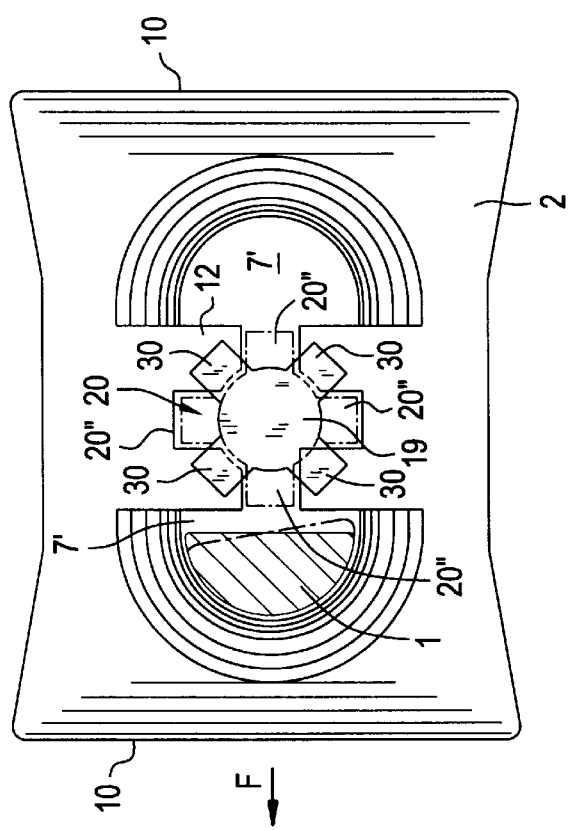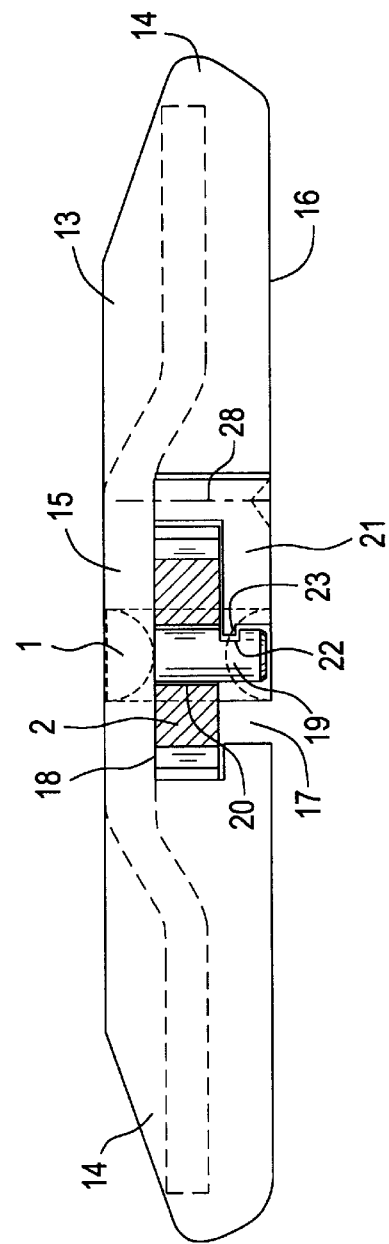

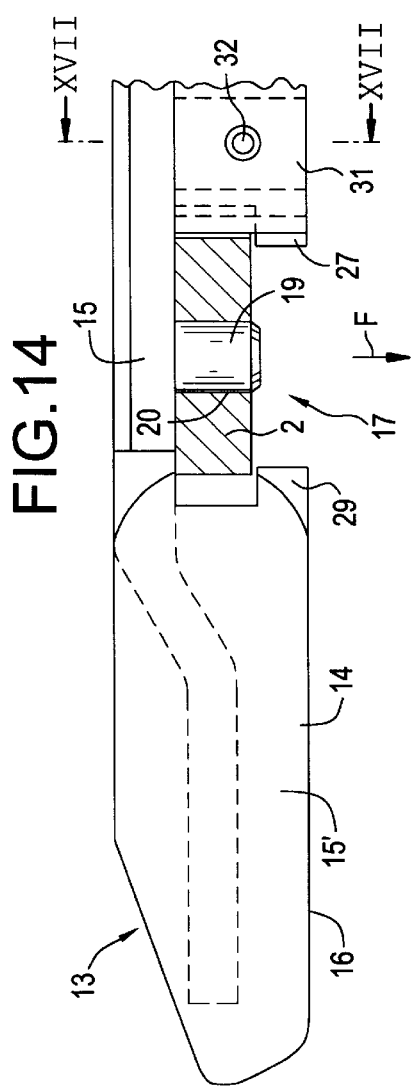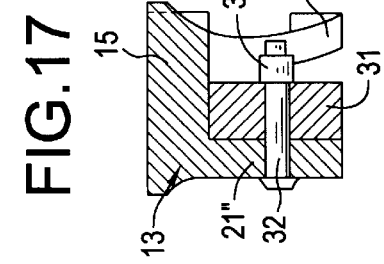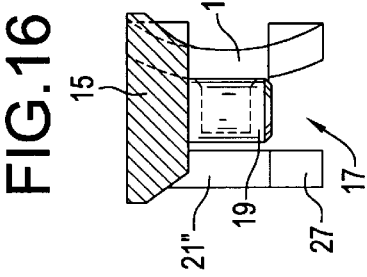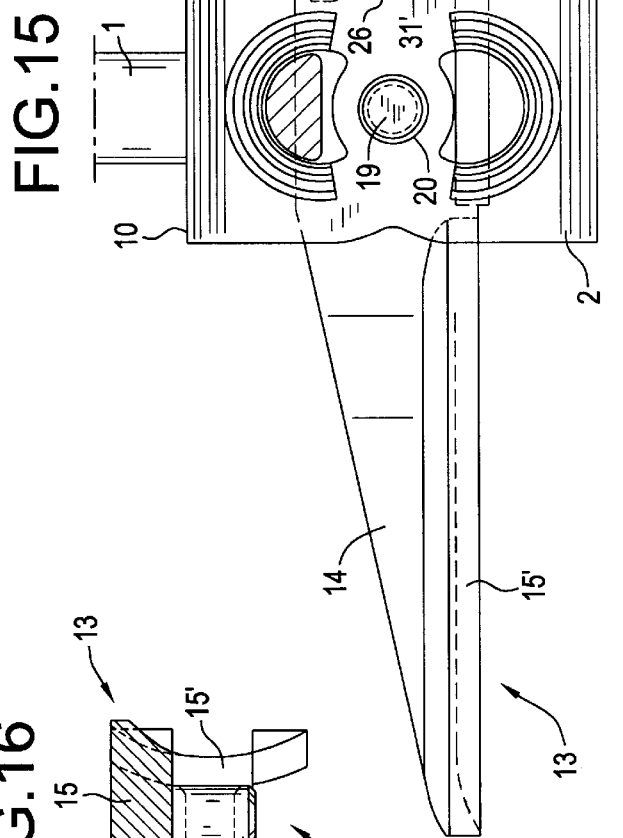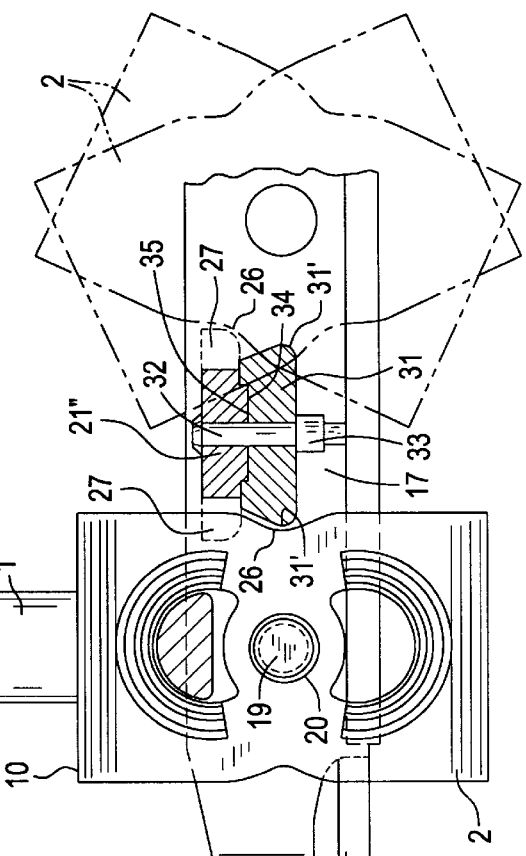

SCRAPER CHAIN BELT FOR SCRAPER CHAIN CONVEYORS

FIELD OF THE INVENTION

This invention relates to a scraper chain belt for scraper chain conveyors, particularly in their design as central or double central scraper chain conveyors, having scrapers which are detachably attached to the horizontal chain links of the single- or double-run chain belt.

The invention is directed in particular at scraper chain belts for heavy-duty scraper chain conveyors which are used in underground mining and which are used there in particular for working longwall faces of long longwall face lengths.

DESCRIPTION OF THE PRIOR ART

Whereas chain links of standard sizes manufactured from round wire were used in the past for the scraper chains of scraper chain conveyors, a change was made a very long time ago to the use for mining conveyors of link chains in which the chain links were of special shape in order to comply with ever-increasing demands on chain strengths and on the operating behaviour of scraper chains. So as to be able to use stronger chains in existing scraper chain conveyors, in accordance with the increased performance requirement of scraper chain conveyors, it has been proposed in the prior art that the vertical chain links of the chains be flattened at their parallel longitudinal limbs, so that their overall height could accordingly be reduced, without a reduction in cross-section, to a size which corresponds to a standard round link chain of lesser chain thickness (DE 32 34 137 C3, DE 36 15 734 C2).

In addition, considerable efforts have been made, aimed at improving the running and loading behaviour of scraper chains, which are highly stressed in use, particularly as regards their stretching behaviour and as regards their cooperation with the chain driving wheels. Thus, for example, it is known that special links can be used for the horizontal chain links of scraper chains; these special links are strengthened and widened at their chain link joint parts, so that the specific contact pressure when the chains circulate round the chain wheels is reduced, and wear on the cooperating faces of the horizontal chain links and of the chain wheel gearing is thereby reduced also (DE 22 47 300 B2, DE 32 19 178 C2, DE 32 35 474 C2). In these chains, the usual round wire chain links are used, as a welded construction, for the vertical chain links.

Numerous scraper designs having different connections of the scrapers to the chain belts are known for scraper chain conveyors used in mining. The most common of all are scrapers which can be detachably and replaceably attached by a screwed connection to the chain links, mostly the horizontal chain links, of scraper chain belts consisting of round chain links (DE 19 37 608 B2, DE-U 81 34 429.5). In addition to these, however, it has already been proposed in the prior art that the scrapers be attached to the scraper chains without screwed connections, e.g. by providing the one-piece scrapers on their top faces with pocket formations in which the horizontal chain links of the single- or double-run scraper chain are suspended, a tension-resistant connection of the scrapers to the scraper chains being effected by providing the scrapers with studs which fit into the internal openings of the horizontal chain links (DE 21 06 967 A1). Finally, designs of scrapers are known in which locking strips are used for securing the scrapers to the horizontal chain links of the scraper chain belt. These locking strips are detachably fixed to the scraper base by means of heavy dowel pins, and close the chain bed recesses, which receive the horizontal chain links, in the direction of the scraper base (DE-U 1 949 166).

The object of the present invention is mainly to create a scraper chain belt for heavy-duty scraper chain conveyors, particularly mining conveyors, which makes possible a reliable scraper connection to the single- or double-run scraper chain using a comparatively simple scraper design, particularly if a link chain of high chain strength is used which is appropriate for the long conveying lengths and correspondingly high performance requirements which are demanded of scraper chain conveyors.

SUMMARY OF THE INVENTION

The aforementioned object is achieved according to the invention in that the horizontal chain links serving for the scraper connection are constructed in the manner of webbed chain links, to fixed central webs thereof, which pass transversely through the internal opening thereof, the scrapers are attached. At the same time, insertion openings for studs which are fixedly disposed on the scrapers are preferably provided in the central webs of the horizontal chain links, wherein the arrangement is advantageously designed so that the studs, which are oriented towards the scraper base, are disposed on crosspiece parts of the scrapers which fit over the scraper chain belt. Instead of this, however, an arrangement is also possible in which the horizontal chain links serving for the scraper connections have coupling elements on their central webs, particularly such as protruding studs or the like, for the scraper connection. These coupling elements or studs or the like are advantageously integrally formed in one piece on the horizontal chain links or on the central webs thereof.

In the scraper chain belt according to the invention, the scraper connection is accordingly made to the horizontal chain links of the single- or double-run scraper chain, wherein these horizontal chain links are designed, in the manner of webbed chain links, as special links which are strengthened by their central webs. These sturdy special links form the basic elements for the scraper connection, which can be effected in various ways. In a preferred embodiment, however, this is accomplished by means of coupling studs which are fixedly disposed, preferably as one piece, on the scrapers, and which can be inserted in the insertion openings disposed in the central webs of the horizontal chain links, whereby a tension-resistant scraper connection is produced in which the engagement of the studs can be secured by locking elements. Instead of this, however, the coupling studs can also be fixedly disposed as mentioned above, preferably in one piece, protruding upwards on the central webs of the horizontal chain links, the insertion openings for the studs in this case being disposed on the scrapers themselves. In all these cases a reliable and easily produced scraper connection to the horizontal chain links of the scraper chain belt can be effected with the aid of the inserted stud connections. In the scraper chain belt according to the invention, either all the horizontal chain links or only the chain links serving for the scraper connection can be designed in the manner of webbed chain links.

As mentioned above, in the scraper chain belt according to the invention the tension-resistant coupling of the scrapers to the horizontal chain links is preferably effected by means of coupling studs which can be inserted in insertion openings in the central webs of the horizontal chain links or of the scrapers. These studs can be of correspondingly sturdy construction and may also be designed with different stud cross-sections. During a conveying operation, the scrapers are guided as usual in the guide channels of the side sections of the conveyor pan, so that they cannot be detached from their coupling engagement with the scraper chain belt. Nevertheless, in order to achieve reliable securement of the scraper connections it is recommended that the coupling engagement of the studs be secured by means of locking elements. The latter may be associated with the studs or may be disposed on the studs, but may also be fixedly disposed on the scraper itself. Securement of the scraper connections can thereby be effected in very different ways, preferably without costly, sensitive screw locking devices.

In one advantageous embodiment of the invention, the scrapers are secured to the horizontal chain links of the scraper chain belt by means of rotary locking, wherein the studs have cam-like locking elements or the like at their free ends which can be introduced into the locking position by a relative rotary movement between the scraper and the horizontal chain link. If the studs are disposed on the scrapers, the cam-like locking elements fit under the horizontal chain links in the locked position, whereby the scrapers are reliably secured against detachment from these chain links. This embodiment of a scraper securing means is distinguished by its particularly simple form and ease of manipulation, as well as by its high operational reliability; it permits simple and rapid scraper connection to the scraper chain belt, and also permits rapid replacement of the scrapers during operational use, if need be. Advantageous design features of this scraper securing means in the form of a rotary locking means are given in the individual claims.

However, locking arrangements different from the above can also be provided for the securement of the scraper connections to the horizontal chain links, e.g. locking elements which can be attached to the studs, particularly detachable locking strips which can be attached to the studs. Studs which are fixedly disposed on the scrapers are advantageously designed so that their free stud ends protrude downwards from the insertion openings of the horizontal chain links, wherein the locking elements on the free stud ends are in locking engagement. In this respect, the studs may have locking recesses at their free ends for the engagement of locking projections or the like which are disposed on the locking elements. Instead of this, however, the studs may also have transversely aligned locking lugs or the like at their free ends, wherein the locking strips which fit under the horizontal chain links fit over the locking lugs. The locking strips, which are constructed as detachable connecting parts, may at the same time form carrier faces for the scrapers in the region of the scraper connection to the horizontal chain links. Instead of this, however, it is also possible to effect securement of the scraper connection solely by the form of the scrapers, i.e. by parts which are fixedly and non-detachably disposed on the scrapers and which fit under the horizontal chain links of the scraper chain belt which are fitted on to the studs.

In a further advantageous embodiment of the invention, the scrapers have pocket recesses, which are open towards the scraper base and/or the scraper side, underneath their bridge-like crosspiece or top part, in which pocket recesses the studs are situated, and which receive the horizontal chain links as well as the locking elements. The arrangement can advantageously be designed at the same time so that the bottom edges of the locking strips which are disposed in the pocket recesses of the scrapers are situated approximately in the plane of the scraper bases, so that the locking strips completely or substantially close the pocket recesses, which are situated in the central region of the scrapers, in the direction of the scraper base.

The locking elements may be held and secured in their locked position on the scrapers solely by their positive locking, in fact firstly by their positive locking with the studs, and secondly by their positive locking with a part of the scraper which is disposed at a distance from the stud locking means; on a double-run scraper chain for double central scraper chain conveyors, this part is formed by a second stud on the scraper. The scrapers therefore comprise two parallel vertical studs here, which are fixedly disposed with a lateral spacing, which each fit into the insertion opening of the two horizontal chain links, which are disposed side by side with a lateral spacing, of the two scraper chains, and which are secured in their stud engagement by means of a common locking piece, preferably a locking strip. A locking strip can advantageously be used here which has a limb which protrudes into the intermediate space between the two parallel horizontal chain links, and which has a locking limb which fits under the two horizontal chain links through which the studs pass. The horizontal chain links of the double-run scraper chain which are associated with the common scraper advantageously each contain an arcuately hollowed bearing recess centrally on their mutually facing sides, wherein the protruding limb of the locking strip fits, by way of bearing faces of convex curvature, into these bearing recesses. In this manner a scraper connection can be produced without additional locking elements, such as screws, dowel pins, wedges or the like, being required for the positional securement of the locking elements or locking strips. The construction and installation of the scraper chain belt are thereby considerably simplified.

In one preferred embodiment of the invention, the locking strips are fixedly disposed, preferably in one piece, on the scrapers, and in fact on a double-run scraper chain the locking strips are disposed so that on each scraper the locking strip which is oriented towards the conveyor base is fixedly disposed in the region of the pocket recess between the two studs on the top web of the scraper, and at the same time fits under the two horizontal chain links fitted on to the coupling studs, by means of horizontal locking projections or the like, whereby the scraper connection is secured. In this respect, it is recommended that what is advantageously a plate-shaped spacer element be attached, preferably in an easily detachable manner, to the fixed locking strip, side parts of which spacer element, which are preferably rounded and which protrude laterally beyond the locking strip, fit into the bearing recesses which are centrally disposed on the longitudinal limbs of the two horizontal chain links serving for the scraper connection. The spacer element thereby maintains the two horizontal chain links at their parallel lateral spacing from each other, so that during a conveying operation they are held at their parallel spacing. Said spacer element may consist of a simple plastics part. It is advantageously secured in a transverse direction on the locking strip via a somewhat tongue-and-groove-like positive locking connection. The spacer element is preferably secured to the locking strip so that it is readily detachable, e.g. via a simple pinned or pegged joint or the like.

Irrespective of the particular design of the scraper securing means, the scrapers are advantageously of one-piece construction. In this respect, each scraper may comprise a scraper crosspiece or top crosspiece which is continuous over its length, which comprises carrier strips or the like which extend over the range of length of the two scraper flanks on both sides of the central pocket recess and which are oriented towards the scraper base. These carrier strips form the carrier faces on the two scraper flanks for the mined minerals conveyed in the conveyor pan, wherein the scraper carries the stud or the pair of studs in the region of the extent of the pocket recess, which is open in the direction of conveying and towards the conveyor base and which receives the horizontal chain link or pair of chain links.

In the scraper chain belt according to the invention, the horizontal chain links advantageously have a form which differs from that of the vertical chain links, wherein the vertical chain links are preferably constructed as loop-like chain links in a welded construction, and do not have a central web subdividing their oval internal opening. This also makes it possible to create a high-strength scraper chain, which can successfully be used even in very long lengths and with a correspondingly high performance requirement, e.g. for longwall face conveyors with lengths of around or greater than 400 m, without the weight and overall dimensions of the chain having to be made excessively high or large, and wherein good running and loading behaviour of the scraper chain belt can also be achieved. It is advantageous in this respect if the loop-like vertical chain links, as is known, have a flattened cross-section at their external contour, so that even if a very high chain strength is required the overall dimensions of the scraper chain belt can be kept within limits and the scraper chain belt can also be used on scraper chain conveyors employed in mining, and can be kept to the customary dimensions of the conveyor pans thereof. If the horizontal chain links are designed with the same flattened profile, of approximately semicircular cross-section, encircling their periphery, they can be manufactured relatively easily and inexpensively from rolled sectional wire, in the usual welded construction.

In the scraper chain belt according to the invention, the horizontal chain links are advantageously designed with an external width at their end joint parts which is greater than the external width of the vertical chain links, wherein the horizontal chain links advantageously have an external width, at least at their joint parts or over their entire chain link length, which is at least 30–60% greater than the height or the external width of the vertical chain links. In this respect, the external boundary of the joint parts of the horizontal chain links, when the latter are seen in plan view, is preferably formed from a boundary face which extends at right angles to the chain axis. As is known, the large width of the joint parts of the horizontal chain links improves the circulating behaviour of the scraper chain belt on the driven chain wheel, and the contact pressures between the transversely extending joint faces of the horizontal chain links and the chain wheel are considerably reduced.

Accordingly, a scraper chain belt can be created with the present invention which is preferably suitable for heavy-duty conveyors, particularly for longwall face conveyors of considerable conveying length, the performance requirement of which is of a magnitude such that, when conventional round link chains are used, chain links with a round wire thickness greater than 42 mm, particularly within the range of 46–50 mm, are necessary. For the scraper chain belt according to the invention, the supporting cross-sections of the vertical and horizontal chain links are accordingly designed so that the chain strength approximately corresponds to that of a standard round link chain with a wire diameter of 42–50 mm.

BRIEF DESCRIPTION OF THE DRAWINGS

Other advantageous design features of the invention are given in the individual claims, and follow from the description given below of the examples of embodiments shown in the drawings, where:

FIG. 1 is a view of an individual scraper, as seen in the longitudinal direction of the scraper chain conveyor, of a double-run scraper chain belt according to the invention, wherein the horizontal chain links serving for the scraper connection are shown in vertical section;

FIG. 2 is a view, as seen from the underside of the scraper, of the scraper chain belt shown in FIG. 1, corresponding to line II—II of FIG. 1;

FIG. 5 is an illustration which corresponds to that of FIG. 1, but which is a schematic simplified illustration of an alternative embodiment of the scraper securing means with the aid of the T-shaped locking strip which fits under the two horizontal chain links;

FIG. 6 illustrates the arrangement shown in FIG. 5, likewise as a simplified schematic illustration, as a view from the underside of the scraper;

FIG. 7 is an illustration which corresponds to that of FIG. 1, but which is likewise schematically simplified, of a further embodiment of the scraper securing means for the scraper connection on the two horizontal chain links of the scraper chain belt;

FIG. 8 is a plan view corresponding to FIG. 7;

FIG. 12 is a plan view of a single horizontal chain link of the scraper chain belt according to the invention, showing an embodiment of the rotary locking means which is modified compared with FIGS. 10 and 11;

FIG. 13 is a view, corresponding to that of FIG. 1, of a single scraper in its connection position on a single-run scraper chain belt according to the invention, for use on a central scraper chain conveyor;

FIG. 14 is a partial view of a scraper, towards the direction of conveying F, showing a preferred embodiment of a scraper and its scraper connection;

FIG. 15 is a plan view of FIG. 14, wherein different angular positions of the second horizontal connecting chain link of the double-run scraper chain are indicated merely by dash-dot lines;

FIG. 16 is a vertical section through the scraper shown in FIGS. 14 and 15, in the region of its central pocket recess; and FIG. 17 shows the scraper of FIGS. 14 to 16, likewise as a vertical section through the locking element integrally formed thereon in one piece and with the spacer element attached to the locking element, corresponding to line XVII—XVII of FIG. 14.

A PREFERRED EMBODIMENT

Figure 3:
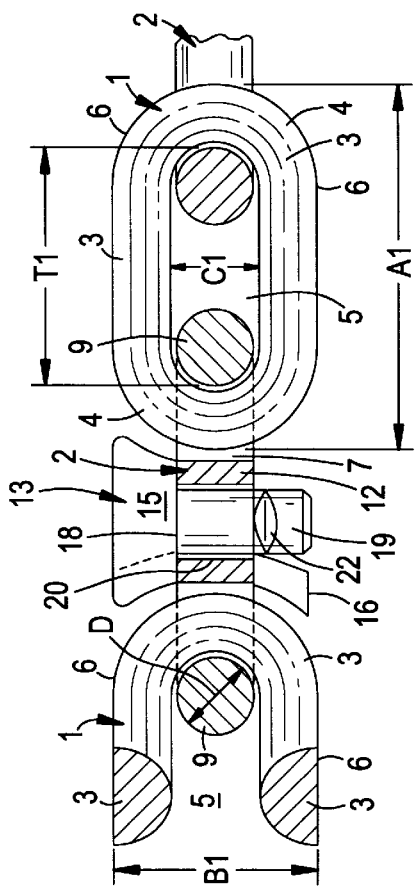
FIG. 3 is a short partial section of the scraper chain belt shown in FIGS. 1 and 2.

The scraper chain belts shown in the drawings consist either of a double-run scraper chain belt for a double central scraper chain conveyor or of a single scraper chain belt for a central scraper chain conveyor, wherein the two chain links of the double-run scraper chain belt are of identical construction to each other and the single chain of the single-run scraper chain belt corresponds to the link chains of the double-run scraper chain belt.

As can be seen from FIGS. 1 to 4 in particular, the chain links of the single- or double-run scraper chain belt consist, as usual, of chain links 1 and 2, which are suspended articulated within one another and which can move with articulation in the two mutually perpendicular planes of the chain, namely the upright or vertical chain links 1 and the recumbent or horizontal chain links 2 which are secured therein. The vertical and horizontal chain links 1 and 2 are constructed differently to each other as regards their form and dimensions. The horizontal chain links 2 preferably consist of one-piece forged parts, whilst the vertical chain links 1 consist, as is customary for round link chains, of sectional wires formed in the manner of loops which, after they are suspended in the horizontal chain links 2, are joined by but welding at their sectional limbs to form closed chain links. The vertical chain links have a cross-section which is constant all round, namely a flattened cross-section which runs round their external contour, preferably an approximately semicircular cross-section as indicated by the cross-sectional face F1 in FIGS. 1 and 2. The vertical chain links 1 accordingly consist of the two parallel longitudinal limbs 3 (FIG. 3) which are joined at their ends via arcuate joint parts 4 to form one piece, and the oval internal openings of which are denoted by 5. Accordingly, the vertical chain links 1 are constructed in the manner of the chain loops which are customary for round link chains, but comprise an approximately semicircular cross-section F1 which runs round via the longitudinal limbs and the joint parts 4, the flattened external face of which cross-section is denoted by 6. A1 denotes the length, B1 denotes the width (height), T1 denotes the span and C1 denotes the clear internal width of the oval internal opening 5 of the vertical chain links 1.

Figure 4:
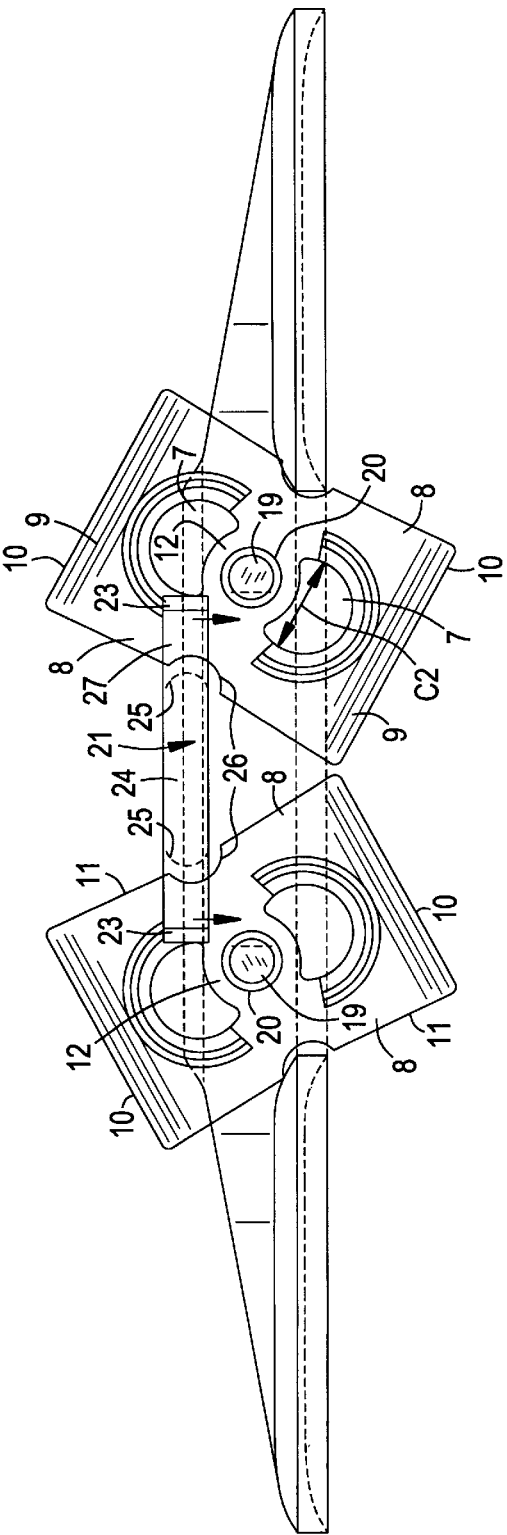
FIG. 4 is a view, corresponding to that of FIG. 2, of an individual scraper with the two associated horizontal chain links, and of the locking strip which secures the scraper connection during its introduction into the locked position.

The chain links 2 which are parallel to the plane of conveying, and which are therefore horizontal, are of approximately plate-shaped form with flat upper and lower faces, and preferably consist of one-piece forged parts. The length of the chain links 2, and therefore their dimension in the direction of conveying, is denoted by A2, and their width is dented by B2 (FIG. 2). The two mutually parallel longitudinal limbs 8 of the chain links 2 are joined at their two ends via joint parts 9 to form one piece, the external boundary of which, as seen in plan view in FIGS. 2 and 4, is formed from a boundary face 10 running at right angles to the chain axis (direction of conveying F). The horizontal chain links 2 are of symmetrical construction with respect to their longitudinal and transverse axes, the width B2 of these chain links 2 being determined by the length of the boundary faces 10 of the joint parts 9 at their ends. The extent of span T2 of the horizontal chain links 2 is equal to or advantageously somewhat longer than the extent of span T1 of the vertical chain links 1. The clear internal width C2 of the internal opening 7 of the chain links 2 is significantly greater than the clear internal width C1 of the vertical chain links 1, and the dimension C2 is advantageously about 30–50 larger than the dimension C1, so that the vertical chain links 1 can be suspended in the internal openings 7 of the horizontal chain links 2. The clear internal width C2 only needs to be greater than the dimension L of the flat 6 on the vertical chain links 1 by the requisite articulation clearance here. The length A2 of the horizontal chain links is significantly greater, preferably by about 40–60%, than the length A1 of the vertical chain links. The horizontal chain links 2 have an external width over their entire length which is greater than that of the vertical chain links 1, and the width dimension B2 is advantageously about 40–60% larger than the width dimension B1 of the vertical chain links 1.

The horizontal chain links 2 have their largest width dimension B2 at their two joint parts 9 at their ends, since they are provided with lateral recesses 11 on their lateral boundaries formed by the longitudinal limbs 8. The horizontal chain links 2 differ from the vertical chain links 1 in that they are constructed in the manner of webbed chain links, and are provided with a central web 12 which is integrally formed in one piece and which passes centrally through their oval internal opening 7. This central web is fixedly joined, in one piece, to the two longitudinal limbs 8, and thereby subdivides the internal opening 7 into two identical suspension openings for the adjoining vertical chain links 1. As shown in FIGS. 2 and 3, the side faces of the central webs 12 of the horizontal chain links 2 are of slightly rounded construction, in the form of a convex arc, towards the two suspension openings. On their chain link longitudinal centre line at their joint parts 9, the horizontal chain links 2 have a round cross-section of diameter D (FIG. 3), which is less than the external width L of the flats 6 on the vertical chain links 1 and the clear internal width C2 of their internal opening 7 which is subdivided by the central web. From this circular cross-section of diameter D which is situated on the chain axis, the cross-section of the joint parts 9 increases towards the lateral external boundaries of the chain links 2, wherein the largest cross-sections are present in the four corner regions of the chain links 2, which in plan view are approximately rectangular, i.e. the largest cross-sections are present in the transition regions between the joint parts 9 and the longitudinal limbs 8. The joint parts 9 of the horizontal chain links 2 have a convex arcuate chain wheel contact face at their end faces which are formed by the external boundaries 10. Moreover, the horizontal chain links 2 have a thickness over their entire length which corresponds to the diameter D of the circular cross-section of their joint parts 9 on the longitudinal axis of the chain links.

Since the horizontal chain links have an external width B2 at their joint parts 9 which is significantly greater than the external width or height B1 of the vertical chain links, relatively large contact faces are formed, when the chain wheel rotates, between the external boundary faces 10 of the chain links 2 and the flanks of the chain wheel teeth on the chain drum which drives and deflects the scraper chain belt.

As mentioned above, the scraper chain belt according to the invention is preferably intended for use in scraper chain conveyors of very considerable conveying lengths and correspondingly high performance requirements, particularly in longwall face conveyors with lengths of 400–500 m. When standard round link chains are used here, chain links having a wire diameter of about 42–50 mm have to be used. So as to be able to use the scraper chain belt according to the invention in heavy-duty scraper chain conveyors such as these, the supporting cross-sections of the vertical and horizontal chain links 1 and 2 are designed so that their strength corresponds to that of the customary round link chains with a wire diameter of 42–50 mm.

In the link or scraper chain described above, all the horizontal chain links 2 can be designed in the manner of webbed chain links having a central web 12 which subdivides their central opening. Alternatively, however, it is possible to provide only those horizontal chain links which serve for the scraper connection with a central web 12, whilst the other horizontal chain links do not have a central web but are provided with an undivided internal opening 7 in which the adjoining vertical chain links 1 are suspended with the requisite articulation clearance. In this last-mentioned case, the scraper chain can be of lighter construction.

FIGS. 1 to 4 show an example of an embodiment of the scraper connection to the two mutually parallel scraper chains of a double-run scraper chain belt. As can be seen from FIG. 1 in particular, the scrapers 13 consist of what is preferably a one-piece scraper length, the two scraper flanks 14 of which, which are guided in the guide channels of the conveyor pan, are joined in the region of the top of the scraper via a fixed crosspiece 15. Underneath the scraper crosspiece 15 the scraper has a pocket recess 17 which is open towards the scraper base, i.e. towards the conveyor pan base, and which receives the two horizontal connecting chain links 2, which are disposed parallel to each other with a lateral spacing, of the double-run scraper chain belt, and which are thus seated against the underside 18 of the scraper crosspiece 15. On its scraper top or scraper crosspiece 15, the scraper 13 has studs 19, which are fixedly disposed at a lateral distance from the two scraper chains of the scraper chain belt and which are oriented vertically towards the conveyor pan base. These studs pass through the insertion openings 20 disposed centrally in the central webs of the two horizontal chain links 2, and the free lower ends of the studs protrude from the insertion openings 20, so that a locking element 21 in the form of a locking strip can be fitted here, and thereby secures the stud engagement and thus the scraper connection to the two horizontal chain links 2. The studs 19 are preferably of cylindrical construction, whilst the insertion openings 20 of the chain links 2 are designed as round holes. It can be seen from FIG. 1 that the ends of the studs 19 which protrude from the insertion openings 20 each have a lateral locking recess 22 for the engagement of locking projections 23 disposed on the locking strip 21. It can also be seen from FIG. 1 that in its locked position the locking strip 21 which forms the locking element at least substantially closes the pocket recess 17 in the central region of the scraper 13, towards the conveyor pan base, and the bottom edge 21' of the locking strip lies approximately in the plane of the scraper base 16. The locking strip 21 is approximately T-shaped in profile and is designed as a plate-shaped flat strip, the thickness of which is significantly less than the length L of the horizontal chain links 2. The locking strip 21 accordingly comprises, in one piece, a protruding limb 24, which fits from below into the intermediate space between the two parallel, horizontal chain links 2, and which has an outwardly curved convex bearing face 25 on its two opposite vertical lateral boundaries, with which the locking strip is supported in a correspondingly arcuately hollowed bearing recess 26 on the mutually facing side faces of the parallel chain links 2, as can be seen from FIG. 2 in particular. The bearing recesses 26 are disposed in the middle of the chain links 2 or of the longitudinal limbs 8 thereof. Underneath the protruding limb 24, the narrow locking strip 21 has a wider locking limb 27 which fits under the two horizontal chain links 2 and which is provided with the locking projections 23 which fit into the locking recesses 22 of the two studs 19. Due to the positive locking of the locking strip 21 to the two studs 19, the scraper connection is secured to the two horizontal chain links 2. Securement of the locking strip 21 in the locked position shown by means of additional locking elements is not necessary, since the locking strip is secured in its locked position by its positive connection to the studs 19 and the horizontal chain links 2.

FIG. 4 is a view from the underside of the scraper of the procedure when introducing the locking strip 21 into the locked position, after the two studs 19 of the associated scraper 13 have previously been inserted in the insertion openings 20 of the two horizontal chain links 2. When the scraper chain belt is slackened, the respective connecting chain links 2 of the same can be swung out in relation to the fitted scraper length 13, into the position shown in FIG. 4, whereupon the protruding limb 24 of the locking strip 21 can be inserted in the free space which is thus formed between the two chain links 2, and its two rounded bearing faces or lateral faces 25 can be introduced into the hollowed-out bearing recesses 26 in the chain links 2. In the course of this procedure, the wider locking limb 27 fits under the two chain links 2, so that when these chain links 2 are swung back into the parallel position shown in FIGS. 1 and 2 the locking projections 23 are inserted in the lateral locking recesses 22 of the studs 19, whereby the scraper connection is secured. In an operating situation, namely during a conveying operation, the two scraper chains of the double-run scraper chain belt are tensioned as usual, so that it is no longer possible for the horizontal chain links 2 which serve for the scraper connection to swing out into the swivelled position shown in FIG. 4, and the inserted locking strips at each scraper connection are thus secured in their locked position solely by positive locking. It can be seen that with the aid of this screwless securement of the scraper connections the installation and replacement of the scrapers is made considerably easier.

FIGS. 5 and 6 show an alternative embodiment for securing the scraper connection with the aid of the locking strip 21, which is approximately T-shaped in profile, and which is shown in FIGS. 1 to 4. The locking strip here has a locking projection 23, which is displaced upwards in relation to its bottom edge 21', at each of the two ends of its lower locking limb 27, which fits under the two horizontal chain links 2. This locking projection fits over a locking lug 22', which is fixedly disposed at the lower free end of the stud 19 and which protrudes transversely in relation to the cylindrical stud, and thereby secures the scraper connection to the horizontal chain links 2 of the double-run scraper chain belt. The description given in connection with FIGS. 1 to 4 is applicable to the remainder of this embodiment. It should be understood that in the embodiment shown in FIGS. 5 and 6 the insertion openings 20 in the central webs 12 of the horizontal chain links 2 are designed as out-of-round, somewhat keyhole-like openings, so that the transversely protruding locking lugs 22' of the coupling studs 19 can be introduced into the insertion openings 20 or the horizontal chain links 2 can be fitted from below on to the coupling studs 19 of the scraper 13, whereupon the locking strip 21 is then introduced into the locked position shown, as described above. The insertion openings 20 are designed here as elongated holes, with their longer axis oriented at right angles to the longitudinal axis of the chain links 2. Moreover, the horizontal chain links are of symmetrical construction with respect to the bearing recesses 26 here also. For reasons of simplifying the drawing, only a single vertical chain link 1 is shown suspended in the suspension opening of the horizontal chain link 2, and the engagement of the locking strip 21 with the locking projection 23 at the locking lug 22' is illustrated for one of the two chain links 2 only.

Figure 9:
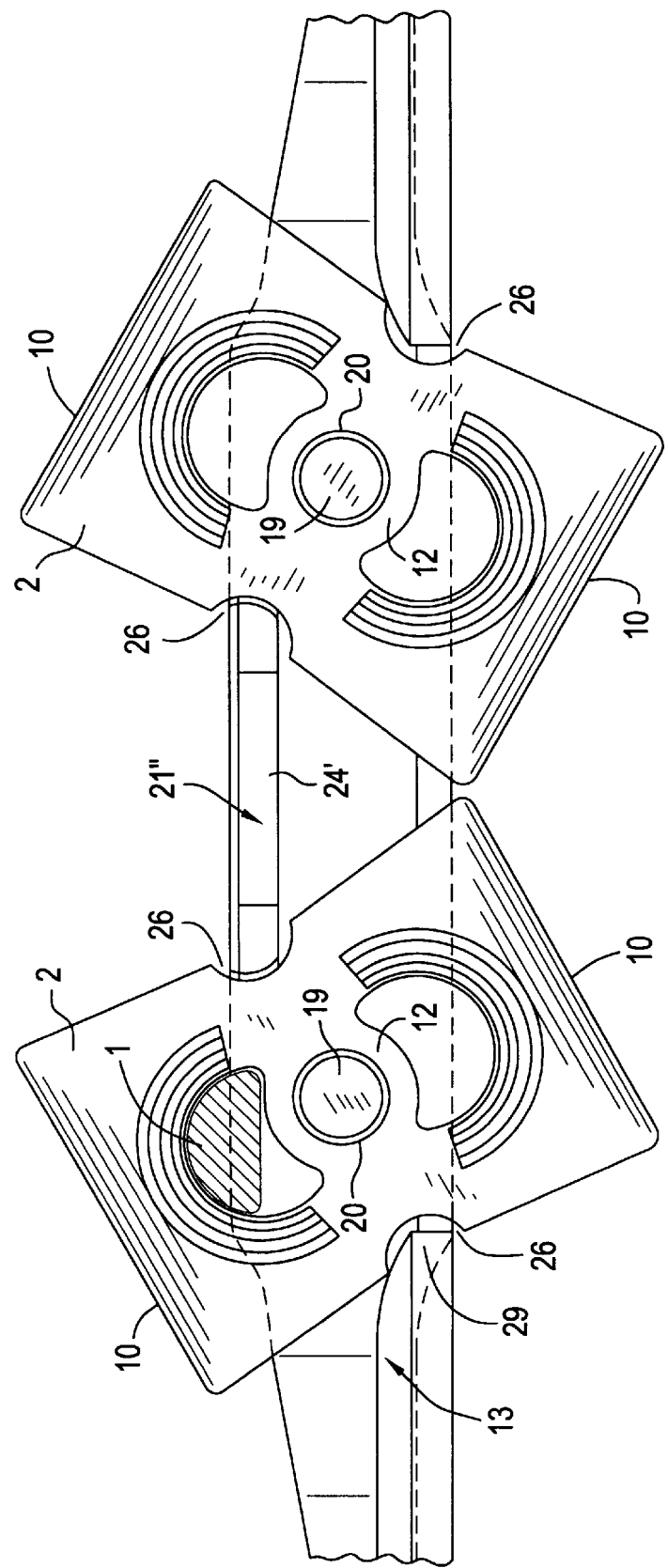
FIG. 9 is also a plan view, showing the procedure during the formation of the scraper connection on the two horizontal chain links of the scraper chain belt.

FIGS. 7 to 9 are views corresponding to those of FIGS. 1, 2, and 4, and are simplified schematic illustrations of a further embodiment of the scraper chain belt, at the horizontal chain links 2, which were described above, of a double-run scraper chain belt for a double central scraper chain conveyor, wherein a locking strip which can be fitted separately as a loose part is not used here for securing the scraper connection. Whereas, in the examples of embodiments described above, the locking strip 21 when situated in the locked position closes the pocket recess 17 of the scraper 13 over almost its entire width in the region between the two chain links 2 and underneath the same, and during a conveying operation of the scraper chain conveyor forms the carrier face for the mined minerals conveyed in the conveyor pan, in the embodiment shown in FIGS. 7 to 9 a locking strip 21" is provided which is fixedly joined to the scraper 13, preferably in one piece, which likewise has an approximately T-shaped profile, and which is fixedly disposed on the top scraper crosspiece 15 between the two horizontal chain links 2 of a double-run scraper chain belt. The locking strip 21" here subdivides the pocket recess 17 situated below the continuous scraper crosspiece 15 into two narrow receiver pockets, each of which receives one of the two horizontal chain links 2 of the double-run scraper chain belt. It can be seen from FIG. 7 that the two chain links 2, which are each fitted on to a cylindrical stud 19, are supported at their mutually facing sides or longitudinal limbs 8 on the wider locking limb 27, and are supported at their other, outer longitudinal limbs 8 on corresponding projections 29, which are likewise fixedly joined, advantageously in one piece, to the scrapers 13. The scraper connection is secured in this manner, i.e. lift-off of the scraper 13 from the horizontal chain links 2 of the scraper chain belt is prevented during a conveying operation. FIG. 7 also shows that the studs 19 here do not necessarily have to protrude downwards from the insertion openings 20 in the central webs 12 of the chain links 2 in order to secure the scraper connection. As shown in FIG. 8, the intermediate space between the two horizontal chain links 2 which are fitted on the studs 19, and in part the intermediate space below these chain links also, is closed by the locking strip 21", which is fixedly disposed on the scraper and which is formed by a crosspiece face below the scraper crosspiece 15, so that in the central region of the scraper the locking strip 21" forms the carrier face thereof for the mined minerals. The connection of the individual scrapers 13 to the horizontal chain links 2 of the double-run scraper chain belt is illustrated in FIG. 9. When the scraper chains are slackened, the insertion openings 20 of the two horizontal chain links 2 of the same are fitted from below on to the studs 19, in the inclined position shown here. This operation is not impeded by the locking strip 21" which is fixedly disposed on the scraper, since the protruding limb 24' of the locking strip fits into the lateral bearing recesses 27, so that in this inclined position the chain links 2 can be slid from below on to the studs 19 without impediment. In the course of this procedure, the locking strip 21" is disposed offset in relation to the centre line of the scraper which passes through the two studs 19, at the back of this centre line. In the inclined position shown in 9, the locking strip 21" fits into the lateral bearing recesses 26, whilst on the opposite side the locking projections 29 can fit into the recesses 26 of the chain links 2 which are situated there, so that the chain links 2 can be placed on the scraper unimpeded by the locking projections 27 and 29 thereof. When the horizontal chain links 2 are subsequently swung about the vertical axes of the studs 19 into their normal parallel position shown in FIG. 8, the locked position shown in FIG. 7 is reached, in which the locking projections 27 and 29 fit under the horizontal chain links 2 and the scraper connection is thereby secured. During a conveying operation, the scraper chain belt is tensioned as usual, so that the horizontal chain links employed for the scraper connection remain in their mutually parallel position shown in FIG. 8 and the scraper connection is thus maintained. Detachment of the scrapers 13 from the horizontal chain links 2 is effected in the reverse manner to the scraper connection described in connection with FIG. 9. The lateral bearing recesses 26 of the horizontal chain links 2 are merely employed here as an installation aid for effecting the scraper connection and for the detachment of the scrapers from the scraper chain belt, but are not employed for the engagement of the protruding limb 24' of the fixed locking strip 21". For the scraper connection shown in FIGS. 7 to 9, it can be seen that no loose parts, which secure the stud engagement after fitting the horizontal chain links 2 on to the coupling studs 19, are used or have to be used for the securement of the scrapers to the scraper chain belt.

Figure 10:
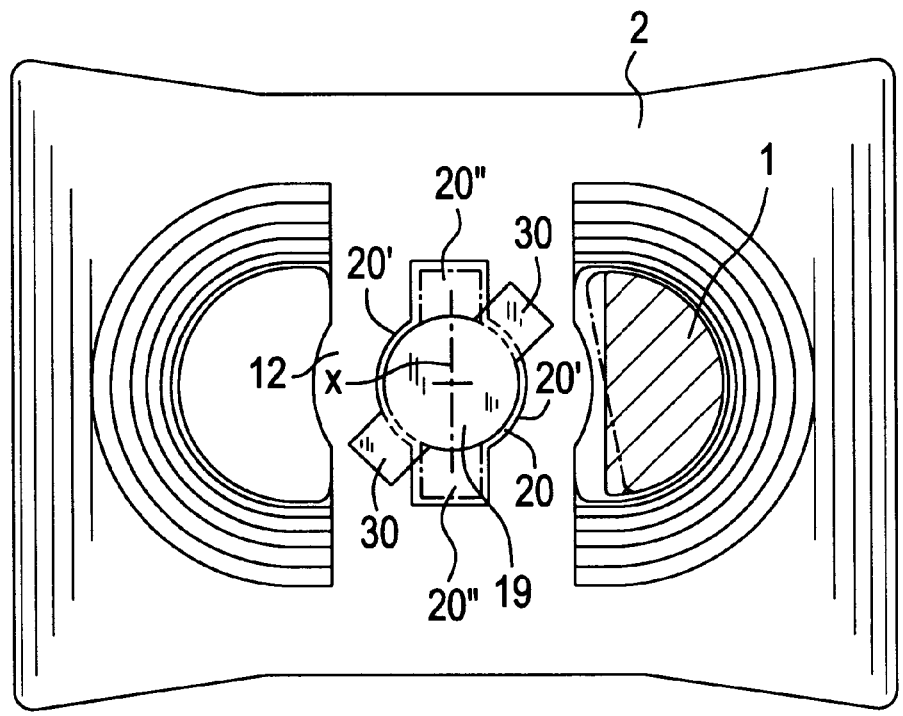
FIG. 10 is a plan view of a single horizontal chain link of a single- or double-run scraper chain belt, showing an advantageous embodiment of the scraper connection with a rotary locking means securing the latter.
Figure 11:
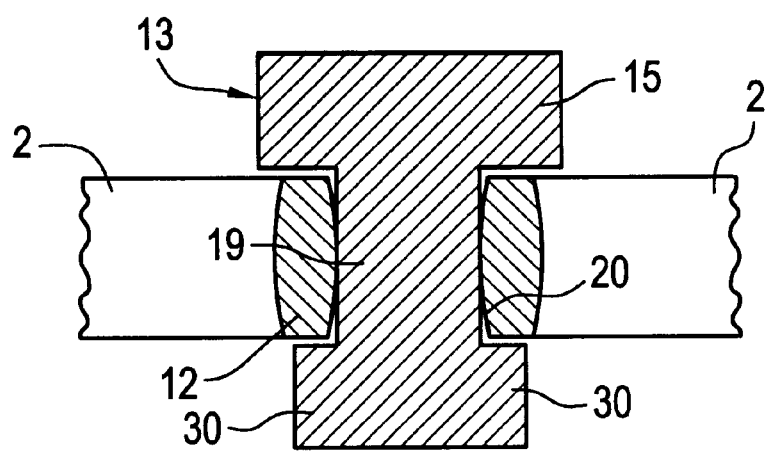
FIG. 11 shows the arrangement of FIG. 10 as a vertical section through the horizontal chain link and through the stud which passes through the insertion opening thereof and which is in the locked position.

The same applies to the embodiment of the scraper chain belt according to the invention which is shown in FIGS. 10 and 11. Only a single horizontal chain link 2 is shown here of the single- or double-run scraper chain belt, which corresponds to the scraper chain belts described above, and in FIG. 10 only a single vertical chain link 1 is shown which is suspended in the internal opening of the horizontal chain link 2. Securement of the scrapers, which are attached to the scraper chain belt or to the horizontal chain links 2 thereof with the aid of the coupling studs 19, is effected here by a rotary locking means. The studs 19 here have widened portions at their free ends which protrude downwards from the insertion openings 20 of the central webs 12 of the horizontal chain links 2. These widened portions form locking cams 30 which are disposed on the diametrically opposite sides of the stud 19, which is of cylindrical shape in its region which passes through the insertion opening 20, and these locking cams fit under the central web 12 of the associated horizontal chain link 2, whereby the stud engagement in the insertion openings 20 of the chain links 2 is secured, and consequently the scraper connection to the horizontal chain links 2 is secured. So as to be able to introduce the studs 19 provided with locking cams 30 into the insertion openings 20 of the horizontal chain links 2, the insertion openings are constructed somewhat in the manner of keyholes, as can be seen from FIG. 10, so that their opening cross-section approximately corresponds to that of the studs 19 at the free lower ends thereof, where the locking cams 30 are situated. The insertion opening 20 in the chain link 2 accordingly has a round central cross-section 20', which is matched to the cylindrical shaped of the stud 19 and which has what is here an approximately rectangular widened portion 20", which is matched to the shape of the locking cams 30, on each of its two opposite sides. The centre of the insertion opening 20 is situated in the centre of the central web 12, and is consequently situated in the centre of the chain link 2, whilst the longitudinal axis X of the insertion holes 20 which are formed as elongated holes extends along the centre line of the central web 12, and therefore transversely to the chain link 2. It can be seen that the horizontal chain link 2 can be placed on the studs in a rotated position in which its keyhole-like widened portions 20" coincide with the locking cams 30. After fitting the horizontal chain link 2 on to the studs 19, the chain link 2 is rotated in relation to the stud 19, e.g. by 30–50°, into its normal connection position, so that the two locking cams 30 then fit under the central web 12 and thus secure the scraper connection. No attachable loose parts are used in this advantageous embodiment of the scraper locking means also, so that the connection of scrapers, and scraper replacement also, can be carried out very easily and rapidly.

It should be understood that the rotary locking which was described above in connection with FIGS. 10 and 11 and which is employed for the securement of the scraper connection can be used both for a single-run scraper chain belt and for a double-run scraper chain belt.

For the rotary locking of the scraper connections which was described above, the coupling stud 19 can also be provided with a different number of locking cams 30 instead of with two locking cams 30. An alternative embodiment such as this is shown in FIG. 12. The stud 19 of the scraper has four locking cams 30 here, in a cross-shaped or star-shaped arrangement, which in the locked position shown fit under the central web 12 of the horizontal chain link 2 and thus secure the scraper connection. The insertion opening 20 is of approximately star-shaped design to match the configuration of the stud 19 at the free lower end thereof which bears the locking cams 30, so that the chain link 2 can be fitted from below on to the studs 19, as was described above in connection with FIGS. 10 and 11. The rotary position of the star-shaped lower end of the stud 19 which bears the locking cams 30 when fitting the chain link 2 on to the stud 19 is indicated in FIG. 12 by broken lines. The rotary locking between the chain link 2 and the stud 19 or scraper 13 can then be effected by rotating the chain link 2 by about 45° about the stud axis. It can be seen from FIG. 12 that the insertion opening 20, which is approximately cross-shaped or star-shaped in profile, extends with its section which is aligned in the longitudinal direction of the chain link 2 over the entire width of the central web 12 of the chain link 2, and runs out at its two ends into the suspension openings 7' for the two adjoining vertical chain links 1. Moreover, the insertion opening 20 here is of symmetrical construction with respect both to the transverse mid-plane and to the longitudinal mid-plane of the horizontal chain link 2, wherein the centre of its hole is situated in the centre of the web.

As mentioned above, the types of scraper securement at the studs of the scraper which were described above can be provided both on a single-run scraper chain belt and on a double-run scraper chain belt.

FIG. 13 is a simplified schematic illustration of an example of the scraper connection on a single-run scraper chain belt of a central scraper chain conveyor. In this case, the scraper 13 only has one stud 19 in its centre, which is oriented downwards towards the conveyor pan base and which passes through the pocket recess 17, which is relatively narrow here. This stud passes through the insertion opening 20 of the respective horizontal chain link 2 of the scraper chain. Securement of the scraper connection is effected here, for example, with the aid of a locking element 21 which is inserted in the pocket recess 17, and which likewise fits with the aid of a locking projection 23 into a locking recess 22 at the free end of the stud, wherein the locking projection 23 is also disposed here at the free end of the locking element 21 which fits under the horizontal chain link 2 in the pocket recess 17. The locking element 21 can be secured in its locked position inside the pocket recess 17 here by means of a separate securing element, e.g. by means of a simple heavy dowel pin 28, which in FIG. 13 is merely indicated by broken lines. Other securing elements can also be used instead of this, however.

In the examples of embodiments described above, the pocket recess 17 which is disposed underneath the top face or underneath the bridge-like crosspiece part 15 of the scraper can be open not only towards the scraper base but, as above, can also be open towards the rear side face and/or towards the side face of the scraper which is at the front in the direction of conveying, wherein the pocket recess is at least substantially closed, for example, by the attachable locking strip which is situated in its locked position or by the locking strip which is fixedly disposed on the scraper, so that the carrier function of the scrapers is ensured over practically the entire length.

FIGS. 14 to 17 show a preferred embodiment of the scraper connection on a double-run scraper chain of the construction described above. The individual scrapers are of one-piece construction here also. They each consist of a top- or scraper crosspiece 15 which is continuous over the length of the scraper, and which has carrier strips 15' which extend on both sides of the central pocket recess 17 over the range of length of the two scraper flanks 14 as far as the free ends of the scrapers, and which are of slightly curved construction in vertical section as can be seen from FIGS. 16 and 17. Between these carrier strips 15' there is the pocket recess 17 which is disposed in the centre of the scraper and which is open towards the conveyor base, and which is also open in the direction of conveying towards the carrier face of the scraper and is also open in the region of passage of the two individual chains of the double-run scraper chain, and which receives the two horizontal chain links 2 of the double-run scraper chain belt which serve for the scraper connection. The two coupling studs 19 are fixedly disposed on the scraper crosspiece 15, preferably in one piece, here also, so that they are inside the pocket recess 17 of the scraper and are oriented towards the conveyor base. A locking strip 21", which is likewise approximately T-shaped in profile, is fixedly disposed, preferably in one piece as is also shown in similar form in FIGS. 7 and 8, centrally between the two coupling studs 19 on the back of the scraper crosspiece 15 which is opposite the carrier face of the scraper. The locking strip here also has two locking projections 27 at its lower end, which both fit under the inner longitudinal limbs of the horizontal chain links 2 which are fitted on the coupling studs 19 and thus secure the web connection. As distinct from the embodiment shown in FIGS. 7 and 8, the spacing of the two horizontal chain links 2 which serve for the scraper connection is not effected with the aid of the fixed locking strip 21", but is effected with the aid of a separate spacer element 31, which is preferably made of plastic and is detachably fixed to the locking strip 21". In the embodiment illustrated, it is fixed with the aid of at least one pin 32 which is passed through aligned holes in the locking strip 21" and in the spacer element 31, wherein the connection is secured with the aid of a locking piece 33, which advantageously consists of a simple clamping sleeve or the like and which is secure on the pin 32 with a clamping action. It can also be seen from FIG. 15 that the strip- or plate-shaped spacer element 31 is secured to the locking strip 2" in the transverse direction of the locking strip, and therefore in the longitudinal direction of the scraper, via a tongue-and-groove-like positive connection. In the embodiment illustrated, this positive connection is formed by a shallow groove 34 on the back face of the spacer element 31 and a projection 35 on the locking strip 21" which fits into this groove. It can also be seen that the spacer element 31 has a width which is somewhat greater than that of the locking strip 21, so that its rounded side faces 31' which project laterally beyond the locking strip can fit into the lateral bearing faces 26 of the two chain links 7, wherein in this position the spacer element holds and maintains the two chain links at their parallel spacing in relation to each other.

FIG. 17 also shows that the spacer element 31 has a length which corresponds to the length of the locking strip 21", wherein the free lower ends of the locking strip 21" and of the spacer element 31 are advantageously situated approximately at the height of the scraper base or are situated slightly below it.

The scraper connection on the double-run scraper chain belt is substantially effected in the manner explained in connection with the preceding examples of embodiments. In the course of this procedure, when the scraper chains are slackened the horizontal chain links 2 which serve for the scraper connection are swung out of the chain axis as indicated by the broken lines in FIG. 15 and are fitted on to the coupling studs 19, and are then swung about the axis of the coupling studs into their normal position, wherein the locking projections 27 of the locking strip 21" fit under the chain links 2 and the lateral locking projections 31' of the spacer element 31 are inserted in the bearing recess 26. Instead of this, however, it is also possible to introduce the lateral locking projections 31' of the spacer element 31 into the bearing recesses 26 after the scraper connection has been effected, and to attach the spacer element detachably to the locking strip 21" with the aid of the said connecting means.

It should be understood that the invention is not limited to the preferred examples of embodiments described above. In particular, the scrapers and the connections thereof to the horizontal chain links of the scraper chain belt may be of different design. In this respect, it is also possible to effect the scraper connections, and thus their tension-resistant joint with the scraper chain belt, with the aid of protruding coupling studs which are disposed, preferably fixedly and in one piece, on the respective horizontal chain links, which coupling studs fit into corresponding insertion openings or stud receivers in the scrapers and thus effect the tension-resistant scraper connection to the scraper chain belt. Locking and securement means of different designs and which are simple to manipulate can also be used for securing the scraper connections. Instead of the locking strips described above, which are either fixedly disposed on the scraper or are attached to the scraper, or instead of the rotary locking means described above, which can also be used when the coupling studs are fixedly disposed on the central webs of the horizontal chain links, other means of securement can also be provided for the connections, e.g. locking elements in the form of stop pieces, clamping rings or pins which can be inserted in holes at the free ends of the studs or the like, which can be detachably fastened to the free ends of the studs. Insertion locking means are also possible, with which locking is effected automatically, for example, when the horizontal chain links 2 are fitted on to the studs 19 or when the scrapers are fitted on to the studs disposed on the chain links. In this respect, locking elements, e.g. annular locking elements, can be resiliently mounted on the free ends of the studs, which locking elements are pressed back elastically when the studs are introduced into the insertion openings and which are elastically released as soon as the chain links 2 or the scrapers are fitted on to the studs to an extent such that these locking elements emerge from the insertion openings in the central web of the horizontal chain links or in the scraper and thus become seated against the underside of the horizontal chain link 2 or against a face on the scraper. Instead of this, resilient locking elements such as these can also be disposed on the underside of the horizontal chain links 2, so that when the studs pass through the insertion openings 20 these locking elements resiliently engage in recesses, e.g. annular grooves, at the free ends of the studs which are disposed on the scrapers here. It should also be understood that when coupling studs are used the scraper connections described above are also possible for other designs of scraper chains or of the chain links thereof, wherein in a preferred embodiment the horizontal chain links or at least the horizontal chain links which serve for the scraper connection are designed in the manner of webbed chain links which differ from the vertical chain links, i.e. the vertical chain links are designed in the manner of chain loops without central webs passing through their internal openings.

It is claimed:

1. A scraper chain belt for a central or double central scraper chain conveyor comprising a chain link belt having a plurality of vertical and horizontal chain links and a plurality of scrapers, a plurality of said horizontal chain links comprising an opening and a web dividing said opening, an insertion opening provided on said web and at least one stud fixedly disposed through said insertion opening to fixedly attach said scraper to said horizontal chain link, a locking element for coupling said stud with said horizontal chain link, said locking element comprising rotary locking means for securing the scraper to the horizontal chain link, said locking means comprising a locking cam on a free end of the stud, for introduction into the locked position by a relative rotary movement between the scraper and the horizontal chain link about a stud axis.

2. A scraper chain belt according to claim 1, wherein the insertion openings are each formed with a round portion and at least one lateral enlargement for passing the locking cam therethrough, the stud having a cylindrical cross section adjacent its locking cam.

3. A scraper chain belt according to claim 1, wherein the stud has four locking cams extending therefrom, and wherein the insertion openings of the horizontal chain links are complementarily formed holes.

4. A scraper chain belt according to claim 1, having at least two fixed locking cams on said free end of the stud, said free stud end fitting under the horizontal chain links and said locking cams being orientated transversely to the stud axis and angularly displaced in relation to each other in the circumferential direction of the stud the insertion openings of the horizontal chain links are formed as out-of-round through-holes that generally conform with the shape of the stud and its locking cams.

5. A scraper chain belt according to claim 4, wherein the out-of-round insertion opening has a center situated centrally on the web of the horizontal chain link.

6. A scraper chain belt for a central or double central scraper chain conveyor comprising a chain link belt having a plurality of vertical and horizontal chain links and a plurality of scrapers, said plurality of said horizontal chain links comprising an opening and a web dividing said opening, an insertion opening provided on said web and at least one stud fixedly disposed through said insertion opening to fixedly attach said scraper to said horizontal chain link, a locking element for coupling said stud with said horizontal chain link, said locking element comprising a locking strip fitting detachably onto said stud as a fixed component of said scraper, means for rotary locking said locking strip onto said stud, said horizontal chain link being mountable on to the stud in a predetermined inclined position and said means for rotary locking said locking strip including means for swiveling said horizontal chain link to a position for engaging said locking strip with said stud and back to an operating position within which said locking strip is fixedly engaged with said stud.

7. A scraper chain belt according to claim 6, including a spacer element comprising side parts, wherein the locking strip is fixedly disposed on the scraper crosspiece in the region of the recess and is provided with locking projections which fit below the horizontal chain link, said spacer element being attached to the locking strip, and side parts of said spacer element protrude laterally beyond the locking strip to fit into a bearing recess which is centrally disposed on the longitudinal limbs of the horizontal chain link.

8. A scraper chain belt according to claim 7, wherein the spacer element is a plastic member.

9. A scraper chain belt according to claim 7, including a tongue-and-groove-like positive locking connection for holding the spacer element in a transverse direction on the locking strip.

10. A scraper chain belt according to claim 7, wherein a pinned joint detachably secures the spacer element to the locking strip.

11. A scraper chain belt system for a central or double central scraper chain conveyor comprising at least one chain link belt having a plurality of vertical and horizontal chain links and a plurality of scrapers, a plurality of said horizontal chain links comprising an opening and a web dividing said opening, an insertion opening provided on said web and at least one stud fixedly disposed through said insertion opening to fixedly attach said scraper to said horizontal chain link, a locking element for coupling said stud with said horizontal chain link, said locking element comprising a locking strip fitting detachably onto said stud as a fixed component of said scraper, means for rotary locking said locking strip onto said stud, said system further including two chain link belts, said locking strip being provided for two studs of each scraper, and two parallel horizontal chain links connected to each said scraper wherein the locking strip has a protruding limb and two locking limbs and the protruding limb fits into an intermediate space between said two parallel, horizontal chain links, and the locking limbs fit under said two horizontal chain links.

12. The scraper chain belt system of claim 11, wherein the horizontal chain links connected to the scraper each have an arcuately hollowed bearing recess on their mutually facing sides, and wherein the protruding limb of the locking strip has two bearing faces of convex curvature which are introduced into the bearing recesses.

13. The scraper chain belt system of claim 12, wherein the locking limbs of the locking strip each have a locking projection, each stud having a locking recess, each locking projection fitting into a corresponding locking recess.

14. A scraper chain belt system for a central or double central scraper chain conveyor comprising at least one chain link belt having a plurality of vertical and horizontal chain links and a plurality of scrapers, a plurality of said horizontal chain links comprising an opening and a web dividing said opening, an insertion opening provided on said web and at least one stud fixedly disposed through said insertion opening to fixedly attach said scraper to said horizontal chain link, a locking element for coupling said stud with said horizontal chain link, said locking element comprising a locking strip fitting detachably onto said stud as a fixed component of said scraper, means for rotary locking said locking strip onto said stud, said system further including two chain link belts, said locking strip being provided for two studs of each scraper, and including a spacer element comprising side parts, wherein the locking strip is fixedly disposed on the scraper crosspiece in the region of the recess and is provided with locking projections which fit below the two horizontal chain links, said spacer element being attached to the locking strip, and side parts of said spacer element protrude laterally beyond the locking strip to fit into a bearing recess which is centrally disposed on a longitudinal limb of each of the two horizontal chain links.

15. The scraper chain belt system according to claim 14, wherein the spacer element is a plastic member.

16. The scraper chain belt system according to claim 14, including a tongue-and-groove-like positive locking connection for holding the spacer element in a transverse direction on the locking strip.

17. The scraper chain belt system according to claim 14, wherein a pinned joint detachably secures the spacer element to the locking strip.

18. A scraper chain belt system for a central or double central scraper chain conveyor comprising at least one chain link belt having a plurality of vertical and horizontal chain links and a plurality of scrapers, a plurality of said horizontal chain links comprising an opening and a web dividing said opening, an insertion opening provided on said web and at least one stud fixedly disposed through said insertion opening to fixedly attach said scraper to said horizontal chain link, a locking element for coupling said stud with said horizontal chain link, said locking element comprising a locking strip fitting detachably onto said stud as a fixed component of said scraper, means for rotary locking said locking strip onto said stud, said system further including two chain link belts and wherein said means for rotary locking said locking strip includes means for swiveling said horizontal chain links to a position for engaging said locking strip with said stud and back to an operating position within which said locking strip is fixedly engaged with said stud.

19. A scraper chain belt system for a central or double central scraper chain conveyor comprising at least one chain link belt having a plurality of vertical and horizontal chain links and a plurality of scrapers, a plurality of said horizontal chain links comprising an opening and a web dividing said opening, an insertion opening provided on said web and at least one stud fixedly disposed through said insertion opening to fixedly attach said scraper to said horizontal chain link, a locking element for coupling said stud with said horizontal chain link, said locking element comprising a locking strip fitting detachably onto said stud as a fixed component of said scraper, means for rotary locking said locking strip onto said stud, said system further including two chain link belts, said locking strip being provided for two studs of each scraper, and wherein the locking strip is formed as a T-shaped narrow, flat strip and is disposed in the recess of the scraper and held therein by means for locking said strip to said studs.

* * * * *